(12) United States Patent
Xiao

(10) Patent No.: US 7,783,062 B2
(45) Date of Patent: Aug. 24, 2010

(54) AUTOMATIC AUDIO DISTORTION CONTROL METHOD AND APPARATUS

(75) Inventor: Min Xiao, Beijing (CN)

(73) Assignee: Beijing Edifier Technology Co., Ltd., Beijing (CN)

( * ) Notice: Subject to any disclaimer, the term of this patent is extended or adjusted under 35 U.S.C. 154(b) by 1385 days.

(21) Appl. No.: 11/222,264

(22) Filed: Sep. 8, 2005

(65) Prior Publication Data

US 2006/0256977 A1   Nov. 16, 2006

(30) Foreign Application Priority Data

May 13, 2005   (CN)   ............... 2005 2 0018567 U

(51) Int. Cl.
*H04R 3/00* (2006.01)
*H03G 7/00* (2006.01)
*H03G 3/00* (2006.01)
*H03F 1/22* (2006.01)
*H03G 3/10* (2006.01)

(52) U.S. Cl. ............... 381/94.1; 381/106; 381/107; 330/2; 330/297; 330/281

(58) Field of Classification Search ............... 330/2, 330/279, 281; 381/94, 106, 107, 94.1
See application file for complete search history.

(56) References Cited

U.S. PATENT DOCUMENTS

| | | | | |
|---|---|---|---|---|
| 4,318,053 | A | * | 3/1982 | Sondermeyer ............... 330/281 |
| 5,453,716 | A | * | 9/1995 | Person et al. .................. 330/2 |
| 5,510,743 | A | * | 4/1996 | Shi ............................. 327/165 |

OTHER PUBLICATIONS

Ron Mancini, Adding hysteresis to comparators, May 3, 2001, EDN, p. 22.*

* cited by examiner

*Primary Examiner*—Vivian Chin
*Assistant Examiner*—Friedrich Fahnert
(74) *Attorney, Agent, or Firm*—Workman Nydegger

(57) ABSTRACT

Disclosed is an automatic audio distortion control method and apparatus, wherein the automatic audio distortion control apparatus comprises an amplifier (6) and a feedback loop which has its both ends coupled to an input and an output of the amplifier (6), wherein said feedback loop has clipping distortion of signals outputted from the amplifier (6) as a control parameter for automatic control on the distortion of the amplifier (6). Once the outputted level gets close to a limit-value of speakers, the method and the apparatus will regulate power amplifier gain automatically, in order to control distortion, prevent damage to the speakers, and provide compatibility with high or low levels inputted from various audio sources.

11 Claims, 2 Drawing Sheets

AUTOMATIC AUDIO DISTORTION CONTROL METHOD AND APPARATUS

FIELD OF THE INVENTION

The present invention relates to an automatic distortion control method and apparatus, particularly to an automatic audio distortion control method and apparatus.

BACKGROUND OF THE INVENTION

Multimedia speakers have been widely used in PCs, home entertainment, and business offices or the like, and are used together with soundcards, personal stereos, CD players, DVD players, laptop computers, MP3 players and mobile telephones, etc. Thus, it is necessary to consider the problem of matching between multimedia speakers and different kinds of audio source devices. Common multimedia speakers employ analog line input ports (LINE IN), which directly matches analog signal line output (LINE OUT) of any of the above audio source devices, only if the line input impedance of the multimedia speaker is greater than or equal to the line output impedance of the audio source.

However, since application situations, power sources, output stage or the like of various audio sources are different from each other in design, thus their line output levels varying, peak-to-peak value Vpp of an output voltage of an audio source may be several times that of another. Even for the same one audio source, e.g., a DVD player, the output level in CD playback mode is different from that in DVD playback mode.

In addition, since power P is equal to $U^2/R$, if a maximum gain of a power amplifier and a speaker impedance are constant, and a maximum output voltage is proportional to an input signal voltage, the power output of the amplifier is proportional to the square of the input signal voltage. That is, if the difference of output levels between two audio sources is 5 times, the difference of power output of the amplifer will be 25 times.

Furthermore, since a power amplifier of a audio system has its rated power output, the Total Harmonic Distortion (THD) will rise steeply when the output level exceeds the rated power, resulting in severe impact on sound effect and even chip breakdown due to over-current in the power amplifier as well as permanent damage to voice coil of a driver units due to overheat.

Therefore, in designing of the power amplifier gain of multimedia speakers, it is necessary to make a trade-off between various audio sources that have high or low output levels. Typically, power amplifier circuits with a variable gain are used to implement compatibility of multimedia speakers with high or low levels input from various audio sources, thus preventing severe distortion of and providing protection for the speakers.

The existing negative-voltage feedback circuits and negative-current feedback circuits are directed to use output voltage or current values to avoid severe distortion. However, since a speaker is a inductive load with complicated frequency variation of instantaneous music signals, it is difficult for these feedback circuits to reflect actual power output, distortion and temperature characteristic of the amplifier. Furthermore, due to the expensive and complicated hardware circuits, debugging workload thereof is heavy. In addition, common Automatic Gain Control (AGC) circuits use voltage output as feedback to control amplifier gain. However, they operate in continuous and simplex regulation mode, and therefore severe fluctuation of the sound level may occur.

SUMMARY OF THE INVENTION

The present invention provides an audio distortion control method and apparatus, which enable multimedia speakers to match to different kinds of audio sources, so that the multimedia speakers can exploit their capabilities better. In the method and apparatus provided in the present invention, once the output level is close to the limit value of the speakers, the power amplifier gain will be regulated automatically, so as to control audio distortion of the speakers and protect the product against damage, as well as provide better hearing experience to the user.

In a first aspect, the present invention provides an automatic audio distortion control method for use in an automatic audio distortion control apparatus comprising an amplifier (6) and a feedback loop which has its both ends coupled to an input and an output of the amplifier (6), wherein said method has clipping distortion of signals outputted from the amplifier (6) as a control parameter for automatic control on the distortion of the amplifier (6).

Preferably, the method comprises the steps of: a) performing sampling on levels outputted from an amplifier (6); b) converting the sampled levels into pulses representing durations of clipping distortion; c) measuring multiple pulse widths t1 to tn within a period of time of ΔT; d) calculating an equivalent mean distortion $D_{eq}$ for the period of time ΔT with the multiple pulse widths t1 to tn; e) comparing the calculated equivalent mean distortion $D_{eq}$ with a predefined distortion threshold $D_0$; and f) generating a gain control correction instruction for the amplifier (6) based upon the comparison result.

Preferably, said step b) is performed with a hysteresis comparator.

Preferably, the period of time ΔT in said step c) ranges from 500 ms to 2000 ms.

Preferably, the equivalent mean distortion $D_{eq}$ in said step d) has following relationship with the multiple pulse widths t1 to tn:

$$D_{eq} = \sqrt[m]{\sum_{j=1}^{n} (tj)^m}$$

Preferably, m is an integer number of 1, 2, or 3.

Preferably, said step f) generates the correction instruction for reducing the gain of the amplifier (6) when $D_{eq}$ exceeds $D_0$.

In a second aspect, the present invention provides an automatic audio distortion control apparatus, comprising an amplifier (6) and a feedback loop which has its both ends coupled to an input and an output of the amplifier (6), wherein said feedback loop has clipping distortion of signals outputted from the amplifier (6) as a control parameter for automatic control on the distortion of the amplifier (6).

Preferably, said feed loop comprises: a first means (7) coupled to an output of the amplifier (6), for performing sampling on levels outputted from the amplifier (6) and converting the sampled levels into pulses representing durations of the clipping distortion; and a second means (5) coupled to the first means (7), for receiving the pulses from the first means (7), measuring multiple pulse widths t1 to tn within a period of time ΔT, calculating a predefined equivalent mean distortion $D_{eq}$ for the period of time ΔT, comparing the calculated $D_{eq}$ with a distortion threshold $D_0$, and generating a gain control correction instruction for the amplifier (6) based upon the comparison result.

Preferably, the apparatus further comprises an electronic volume controller (4) connected between the second means (5) and the amplifier (6), for receiving the gain control correction instruction from the second means (5) and in turn controlling the gain of the amplifier (6).

Preferably, the apparatus further comprises a control interface (3) connected to the second means (5), for providing manipulators for control on the amplifier (6).

Preferably, the first means (7) comprises a hysteresis comparator for converting the sampled levels into pulses representing durations of clipping distortion.

Preferably, the second means (5) comprises a single-chip micro computer unit for performing the operations of pulse reception, measurement, calculation, comparison and instruction generation.

Preferably, the period of time ΔT ranges from 500 ms to 2000 ms.

Preferably, the equivalent mean distortion $D_{eq}$ has following relationship with the multiple plush widths t1 to tn:

$$D_{eq} = \sqrt[m]{\sum_{j=1}^{n} (tj)^m}$$

Preferably, m is an integer number of 1, 2, or 3.

Preferably, the second means (5) generates the correction instruction for reducing the gain of the amplifier (6) when $D_{eq}$ exceeds $D_0$.

The above method and apparatus in the present invention employ clipping distortion as the control parameter so as to implement compatibility with high or low levels inputted from various audio sources, both ensuring high quality of audio output and protects the amplifier and the speaker against damage. Programming techniques for a single-chip Micro Computer Unit (MCU) can implement distortion acquisition with an optimal algorithm, and the parameter in the algorithm can be adjusted flexibly. For different products, the algorithm can also be modified as needed. With an integrated circuit for volume control, a MCU is coupled through a I²C bus or the like, so that the MCU can control the gain of the amplifier intelligently as required. The algorithm embedded in the MCU supports integral or sectional regulation other than continuous gain regulation; in addition, the MCU can regulate the amplifier at appropriate timings according to the status of the sound system as well as the result of real-time analysis, thus avoiding the problem of severe fluctuations of sound which is commonly seen in the case of AGC, and maintains dynamic characteristics of the original music.

BRIEF DESCRIPTION OF THE DRAWINGS

The above and other objects and features of the present invention can be understood better from the description of the preferred embodiment of the present invention with reference to the attached drawings, wherein.

DETAILED DESCRIPTION OF THE EMBODIMENTS

Recent researches indicate that a sound will become noisy and makes us uncomfortable if the volume of the sound is very high when we enjoy music from a audio system. This is mainly due to audio distortion. In addition, the distortion is also related to current and temperature of the power amplifier circuit and the speaker. Therefore, in the embodiment of the present invention, "distortion" is taken as a control parameter.

Terminologically, "distortion" refers to Total Harmonic Distortion (THD). For the power amplifier circuit of multimedia speakers, THD refers to the total harmonic distortion when the input is a sinusoidal wave with $f_0=1$ KHz and the power is equal to half of the rated output power, wherein the THD can be easily reduced to 0.5% or less. However, when the volume increases and the power of the amplifier becomes close to the rated power, THD increases steeply, mainly due to the clipping phenomenon (i.e., clipping distortion, which is the main component of the THD and accounts for 90-95% in THD) in the output of the power amplifier resulted from limited source power. Thus, the requirement for low hardware cost of multimedia speakers can be met through implementing distortion acquisition simply by detecting and calculating the clipping distortion equivalent to the total harmonic distortion, further taking the distortion as the control parameter, and performing subsequent sophisticated calculation with an single-chip Micro Computer Unit (MCU).

Figure 1:
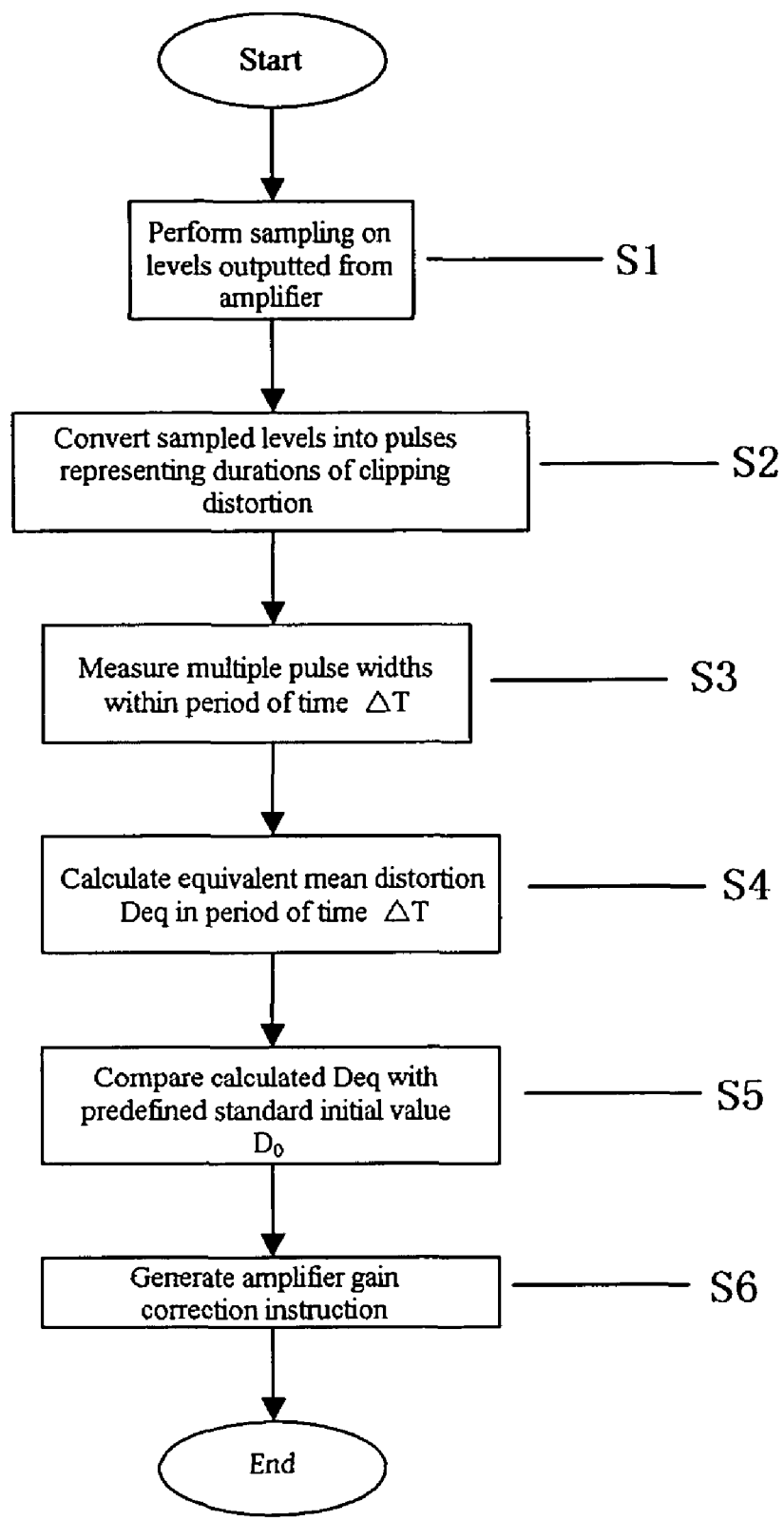
FIG. 1 is a flow diagram of the automatic audio distortion control method provided in the present invention.

As shown in FIG. 1, an input 1, a pre-amplifier 2, a power amplifier 6 and a speaker 8 are essential working parts of common multimedia speakers. In the embodiment, the apparatus of Edifier Intelligent Distortion Control (EIDC) is further equipped with a MCU, a distortion and waveform detector, and an operating control interface, as well as with a common analog volume adjuster replaced by a digital volume controller IC. That is, the apparatus in the embodiment comprises a distortion and waveform detector 7, a single-chip (MCU) 5 and optionally an electronic volume controller 4 and a control interface 3.

The distortion and waveform detector 7 performs sampling on the output signals of the power amplifier 6, rectifies the signals occurred during the clipping time interval into a series of pulses representing durations of the clipping distortion by means of a hysteresis comparator, and then provides the pulses to the MCU 5.

The MCU 5 utilizes an internal timer to measure widths of the pulses representing the distortion. Herein, each pulse width is calculated in unit of MCU's machine cycle. Suppose the pulse widths of n pulses measured in period of time ΔT are respectively t1, t2, t3, ... tn, then the equivalent mean distortion $D_{eq}$ in period of time ΔT can be calculated, for example, with the following formula:

$$D_{eq} = \sqrt[m]{\sum_{j=1}^{n} (tj)^m}$$

In above formula, appropriate values can be set for ΔT and m, depending on special requirements for the product performance and the control sensitivity. Typically, the value range of ΔT is 500 ms~2000 ms, and the value range of m is 1~3.

First, the maximum distortion tolerable to listeners (i.e., threshold $D_0$) has to be determined through a conventional listening test for the product, and the MCU 5 in turn compares $D_{eq}$ with $D_0$. In case of $D_{eq} > D_0$, the MCU 5 generates and sends a corresponding correction instruction to the electronic volume controller 4 through I²C bus, so as to reduce the overall gain of the amplifier by several dBs.

The control interface 3 can implement keys and rotation knobs necessary for normal manipulations of the multimedia speakers, which is coupled to the MCU 5 via a I/O port, and provides features of adjusting volume, tone and volume balance and features of ON/OFF and mute control or the like.

Figure 2:
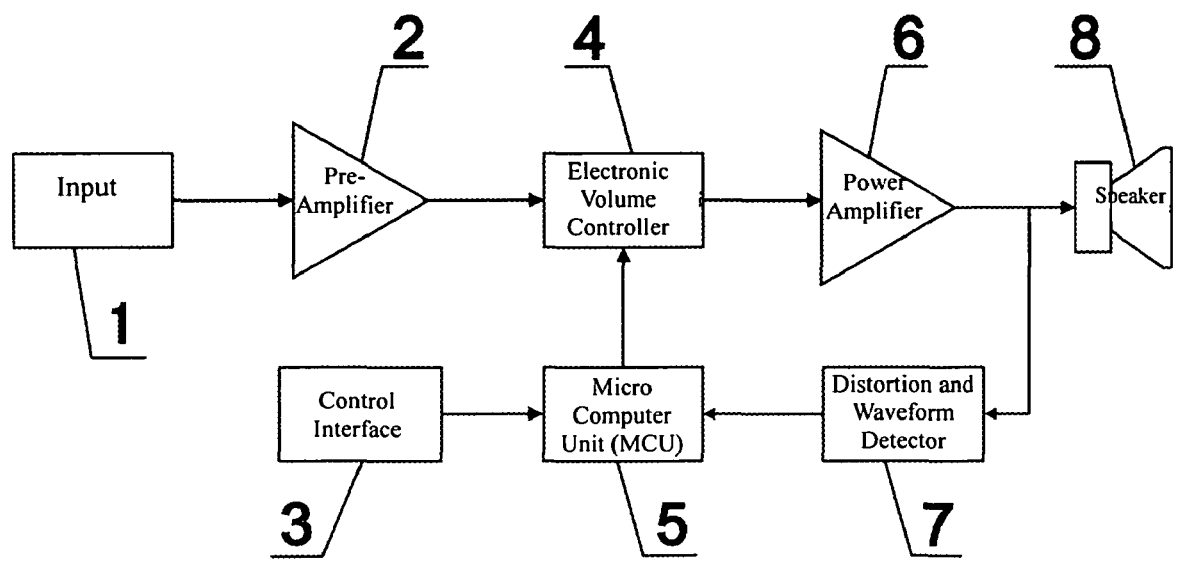
FIG. 2 is a block diagram of the automatic audio distortion control apparatus provided in the present invention.

FIG. 2 shows the flow diagram of the automatic distortion control method used by the above apparatus shown in FIG. 1. As shown in FIG. 2, the output levels of the power-amplifier are first sampled (step S1); the sampled levels are then converted into pulses representing durations of the clipping distortion (step S2); pulse widths t1-tn are measured within a period of time $\Delta T$ (step S3); the equivalent mean distortion $D_{eq}$ in the period of time $\Delta T$ is calculated with these n pulse widths t1-tn (step S4); the calculated $D_{eq}$ is compared with the predefined standard initial value $D_0$ (step S5); finally, the control correction instruction for the power amplifier gain is generated based upon the comparison result, so as to implement automatic control of overall amplifier gain.

While preferred embodiments of the present invention is described for illustrative purpose, those skilled in the art shall understand that various modification, additions, and substitutions are possible without departing from the true scope and spirit of the present invention as is disclosed in the appended claims.

The invention claimed is:

1. An automatic audio distortion control method for use in an automatic audio distortion control apparatus comprising an amplifier (6) and a feedback loop which has its both ends coupled to an input and an output of the amplifier (6), wherein said method has clipping distortion of signals outputted from the amplifier (6) as a control parameter for automatic control on the distortion of the amplifier (6) and comprises the steps of:
   a) performing sampling on levels outputted from an amplifier (6);
   b) converting the sampled levels into pulses representing durations of clipping distortion;
   c) measuring multiple pulse widths t1 to tn within period of time $\Delta T$;
   d) calculating an equivalent mean distortion $D_{eq}$ for the period of time $\Delta T$ with the multiple pulse widths t1 to tn;
   e) comparing the calculated equivalent mean distortion $D_{eq}$ with a predefined distortion threshold $D_o$; and
   f) generating a gain control correction instruction for the amplifier (6) based upon the comparison result,
   wherein the equivalent mean distortion $D_{eq}$ has the following relationship with the multiple pulse widths t1 to tn:

$$D_{eq} = \sqrt[m]{\sum_{j=1}^{n} (tj)^m}$$

and m is one of 1, 2 and 3.

2. The method according to claim 1, wherein said step b) is performed with a hysteresis comparator.

3. The method according to claim 1, wherein the period of time $\Delta T$ in said step c) ranges from 500 ms to 2000 ms.

4. The method according to claim 1, wherein said step f) generates the correction instruction for reducing the gain of the amplifier (6) when $D_{eq}$ exceeds $D_o$.

5. An automatic audio distortion control apparatus, comprising an amplifier (6) and a feedback loop which has its both ends coupled to an input and an output of the amplifier (6), wherein said feedback loop has clipping distortion of signals outputted from the amplifier (6) as a control parameter for automatic control on the distortion of the amplifier (6) and comprises:
   a first means (7) coupled to the output of the amplifier (6), for performing sampling on levels outputted from the amplifier (6) and converting the sampled levels into pulses representing durations of the clipping distortion; and
   a second means (5) coupled to the first means (7), for receiving the pulses from the first means (7), measuring multiple pulse widths t1 to tn within period of time $\Delta T$, calculating a predefined equivalent mean distortion $D_{eq}$ for the period of time $\Delta T$, comparing the calculated $D_{eq}$ with a distortion threshold $D_o$, and generating a gain control correction instruction for the amplifier (6) based upon the comparison result,
   wherein the e uivalent mean distortion $D_{eq}$ has the following relationship with the multiple pulse widths t1 to tn:

$$D_{eq} = \sqrt[m]{\sum_{j=1}^{n} (tj)^m}$$

and m is one of 1, 2 and 3.

6. The apparatus according to claim 5, wherein further comprising:
   an electronic volume controller (4) connected between the second means (5) and the amplifier (6), for receiving the gain control correction instruction from the second means (5) and in turn controlling the gain of the amplifier (6).

7. The apparatus according to claim 5, wherein further comprising:
   a control interface (3) connected to the second means (5), for providing manipulators for control on the amplifier (6).

8. The apparatus according to claim 5, wherein the first means (7) comprises a hysteresis comparator for converting the sampled levels into pulses representing durations of clipping distortion.

9. The apparatus according to claim 5, wherein the second means (5) comprises a single-chip micro computer unit for performing the operations of pulse reception, measurement, calculation, comparison and instruction generation.

10. The apparatus according to claim 5, wherein the period of time $\Delta T$ ranges from 500 ms to 2000 ms.

11. The apparatus according to claim 5, wherein the second means (5) generates the correction instruction for reducing the gain of the amplifier (6) when $D_{eq}$ exceeds $D_o$.

* * * * *